US009300917B2

United States Patent
Yoon et al.

(10) Patent No.: US 9,300,917 B2
(45) Date of Patent: Mar. 29, 2016

(54) CONTENT SUPPLY SYSTEM AND CONTENT SUPPLY METHOD THEREOF AND DISPLAY DEVICE AND CONTROL METHOD THEREOF

(75) Inventors: Yeo-ri Yoon, Suwon-si (KR); Chang-soo Lee, Seoul (KR); Sang-hee Lee, Seoul (KR); Dae-hyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 439 days.

(21) Appl. No.: 12/783,146

(22) Filed: May 19, 2010

(65) Prior Publication Data
US 2011/0119147 A1 May 19, 2011

(30) Foreign Application Priority Data
Nov. 13, 2009 (KR) .......................... 10-2009-0109538

(51) Int. Cl.
*G06F 21/00* (2013.01)
*H04N 7/16* (2011.01)
(Continued)

(52) U.S. Cl.
CPC .......... *H04N 7/163* (2013.01); *G06Q 30/0631* (2013.01); *H04N 7/173* (2013.01); *H04N 21/235* (2013.01); *H04N 21/2381* (2013.01); *H04N 21/25866* (2013.01); *H04N 21/4126* (2013.01); *H04N 21/41407* (2013.01); *H04N 21/454* (2013.01); *H04N 21/4532* (2013.01);
(Continued)

(58) Field of Classification Search
USPC .............. 705/51, 16, 21, 59, 71; 380/44, 262, 380/278, 279
See application file for complete search history.

(56) References Cited

U.S. PATENT DOCUMENTS 7,565,438 B1 * 7/2009 Zhu .................. G06F 21/10
709/219
8,190,709 B2 5/2012 Kanada et al.
(Continued)

FOREIGN PATENT DOCUMENTS

JP 2004-4245 A 1/2004
JP 2005-222184 A 8/2005
(Continued)

OTHER PUBLICATIONS

Extended European Search Report issued on Mar. 9, 2011 in the corresponding European Patent Application No. 10164342.7.
(Continued)

*Primary Examiner* — Dante Ravetti
(74) *Attorney, Agent, or Firm* — Sughrue Mion, PLLC

(57) ABSTRACT

A content supply system and a content supply method thereof, and a display device and a control method thereof which supplies content to the display apparatus, are disclosed. A content supply system, including a user terminal which is used to purchase content; a content supply server which stores therein purchase description information of the first content purchased through the user terminal, and supplies second content based on the purchase description information of the purchased first content; and a display device which transmits usage authorization information to the content supply server corresponding to the purchase description information of the purchased first content, and receives the second content from the content supply server. The present invention supplies content which is purchased by a user through a user terminal and enables a user to use the content without double payment for the content.

19 Claims, 6 Drawing Sheets

(51) Int. Cl.
- *G06Q 30/06* (2012.01)
- *H04N 7/173* (2011.01)
- *H04N 21/41* (2011.01)
- *H04N 21/414* (2011.01)
- *H04N 21/472* (2011.01)
- *H04N 21/81* (2011.01)
- *H04N 21/235* (2011.01)
- *H04N 21/2381* (2011.01)
- *H04N 21/258* (2011.01)
- *H04N 21/45* (2011.01)
- *H04N 21/454* (2011.01)
- *H04N 21/4627* (2011.01)
- *H04N 21/475* (2011.01)

(52) U.S. Cl.
CPC ....... *H04N21/4627* (2013.01); *H04N 21/4753* (2013.01); *H04N 21/47202* (2013.01); *H04N 21/8173* (2013.01); *H04N 21/8193* (2013.01)

(56) References Cited

U.S. PATENT DOCUMENTS

| | | | |
|---|---|---|---|
| 2005/0273399 A1* | 12/2005 | Soma | G06F 21/10 707/758 |
| 2009/0018898 A1* | 1/2009 | Genen | G06Q 30/0601 705/26.7 |
| 2009/0192916 A1* | 7/2009 | Casper | G06Q 20/105 705/26.1 |
| 2009/0217320 A1 | 8/2009 | Aldrey | |
| 2009/0235149 A1 | 9/2009 | Frohwein | |
| 2013/0305381 A1 | 11/2013 | Gordon et al. | |

FOREIGN PATENT DOCUMENTS

| | | |
|---|---|---|
| JP | 2008-537812 A | 9/2008 |
| JP | 2011-509487 A | 3/2011 |
| KR | 10-2007-0096616 A | 10/2007 |
| WO | 2006/099458 A2 | 9/2006 |
| WO | 2008/085896 A2 | 7/2008 |
| WO | 2009/069187 A1 | 6/2009 |
| WO | 2009/088611 A2 | 7/2009 |

OTHER PUBLICATIONS

"Context and Objectives of Rich Media UI Framework v2.0" International Organisation for Standardisation Organisation Internationale De Normalisation ISO/IEC JTC1/SC29/WG11 Coding of Moving Pictures and Audion, Oct. 2008, Busan, KR, 17 pages, XP030016786.

Mendes, P. et., al. "A review of the widget landscape and incompatibilities between widget engines", IEEE Africon, 2009. pp. 1-6, XP031558999.

Communication dated Oct. 28, 2014 issued by the Japanese Patent Office in counterpart Japanese Patent Application No. 2010-180776.

Communication dated Mar. 4, 2014 issued by the Japanese Patent Office in counterpart Japanese Patent Application No. 2010-180776.

Communication dated Apr. 3, 2014 issued by the European Patent Office in counterpart European Patent Application No. 10 164 342.7.

Reiterer, Bernhard et al., "User-Centric Universal Multimedia Access in Home Networks," The Visual Computer, International Journal of Computer Graphics, vol. 24, No. 7-9, Jun. 10, 2008, pp. 837 to 845.

Communication dated Nov. 13, 2015, issued by the Korean Intellectual Property Office in counterpart Korean Application No. 10-2009-0109538.

* cited by examiner

CONTENT SUPPLY SYSTEM AND CONTENT SUPPLY METHOD THEREOF AND DISPLAY DEVICE AND CONTROL METHOD THEREOF

CROSS-REFERENCE TO RELATED APPLICATION

This application claims priority from Korean Patent Application No. 10-2009-0109538, filed on Nov. 13, 2009, in the Korean Intellectual Property Office, the disclosure of which is incorporated herein by reference.

BACKGROUND

1. Field

Apparatuses and methods consistent with exemplary embodiments relate to a content supply system and a content supply method thereof, and a display device and a control method thereof. More particularly, the exemplary embodiments relate to a content supply system and a content supply method thereof and a display device and a control method thereof which supplies content to the display device.

2. Description of the Related Art

A mobile terminal provides various contents such as game, news, daily information including weather, music and comics, as well as a calling function. The content may be purchased from a content supply server. The mobile terminal may be connected to various servers in a network, like a personal computer (PC) and a user may freely purchase desired content.

Likewise, a TV may provide multimedia functions as well as broadcasting, and be connected to the content supply server in a network. The TV may receive various contents from the content supply server and display the content for a user.

If a user purchases and uses content through the mobile terminal, he/she may want to view the same content through the TV. In such a case, a user would purchase the same content again, which is inconvenient and results in the user making double payments for the same content.

SUMMARY

Accordingly, an aspect of the exemplary embodiments is to provide a content supply system and a content supply method thereof and a display device and a control method thereof which supplies to the display device content purchased by a user through a user terminal, such as a mobile terminal.

Additional aspects and/or advantages will be set forth in part in the description which follows and, in part, will be obvious from the description, or may be learned by practice of the present invention.

The foregoing and/or other aspects may be achieved by providing a content supply system, including: a user terminal which is used to purchase content; a content supply server which stores therein purchase description information of a first content purchased through the user terminal, and supplies second content based on the purchase description information of the purchased first content. The content supply system further includes a display device which transmits usage authorization information to the content supply server corresponding to the purchase description information of the purchased first content, and receives the second content from the content supply server.

The content supply server may include a first content supply server which supplies the first content to the user terminal, and a second content supply server which supplies the second content to the display device.

The first content supply server may supply the purchase description information of the purchased first content to the second content supply server, and the second content supply server may receive the usage authorization information from the display device, and supply the second content to the display device if the purchase description information of the first content corresponds to the usage authorization information.

The content supply server may notify the purchaser of the first content when the display device is connected, and supply the second content if the display device accepts the supply of the second content.

The display device may request and receive the second content from the content supply server.

The display device may transmit the usage authorization information based on a user's input.

The second content may include display content corresponding to the first content.

The purchase description information may include first identification information of a user who purchases the first content, the usage authorization information may include second identification information of a user who purchases the first content, and the content supply server may identify whether the first identification information and the second identification information are identical to each other.

Another aspect may be achieved by providing a display device, including: a signal receiver which receives an image signal; a signal processor which processes the image signal received by the signal receiver;

a display unit which displays thereon an image based on the image signal processed by the signal processor; a communication unit which communicates with the content supply server which stores therein purchase description information of a first content purchased through the user terminal, and supplies a second content based on the purchase description information of the purchased first content in a network; and a controller which transmits usage authorization information corresponding to the purchase description information of the purchased first content to the content supply server, and receives the second content from the content supply server.

The apparatus may include a user input unit which receives a user's input, wherein the controller may transmit the usage authorization information based on the user's input.

The controller may request and receive the second content from the content supply server.

Further another aspect may be achieved by providing a content supply method, including: storing in a content supply server purchase description information of a first content purchased through a user terminal; transmitting usage authorization information corresponding to the purchase description information of the purchased first content to the content supply server; and transmitting a second content from the content supply server to the display device if a user has an authority to use the second content based on the purchase description information of the first content purchased from the content supply server and the usage authorization information received from the display device.

The content supply server may include a first content supply server which supplies the first content to the user terminal, and a second content supply server which supplies the second content to the display device.

The first content supply server may supply the purchase description information of the purchased first content to the second content supply server, and the second content supply server may receive usage authorization information from the display device, and supply the second content to the display device if the purchase description information of the first content corresponds to the usage authorization information.

The transmitting of the usage authorization information may include transmitting the usage authorization information based on a user's input.

The transmitting of the second content may include informing the first content purchased from the content supply server to the display device, and supplying the second content if the display device accepts the second content.

The transmitting of the second content may include identifying whether first identification information of a user who purchases the first content included in the purchase description information is identical to second identification information of a user who purchases the first content included in the usage authorization information.

Another aspect may be achieved by providing a control method of a display device which displays an image based on a received image signal, the control method including: storing purchase description information of a first content purchased through a user terminal and accessing a content supply server which supplies a second content based on the purchase description information of the purchased first content; transmitting usage authorization information to the content supply server corresponding to the purchase description information of the purchased first content; and receiving the second content from the content supply server.

The transmitting the usage authorization information may include transmitting the usage authorization information based on a user's input.

The transmitting the usage authorization information may include requesting the content supply server to supply the second content.

BRIEF DESCRIPTION OF THE DRAWINGS

The above and/or other aspects will become apparent and more readily appreciated from the following description of the embodiments, taken in conjunction with the accompanying drawings of which.

DETAILED DESCRIPTION OF EXEMPLARY EMBODIMENTS

Hereinafter, exemplary embodiments will be described with reference to accompanying drawings, wherein like numerals refer to like elements and repetitive descriptions will be avoided as necessary.

Figure 1:
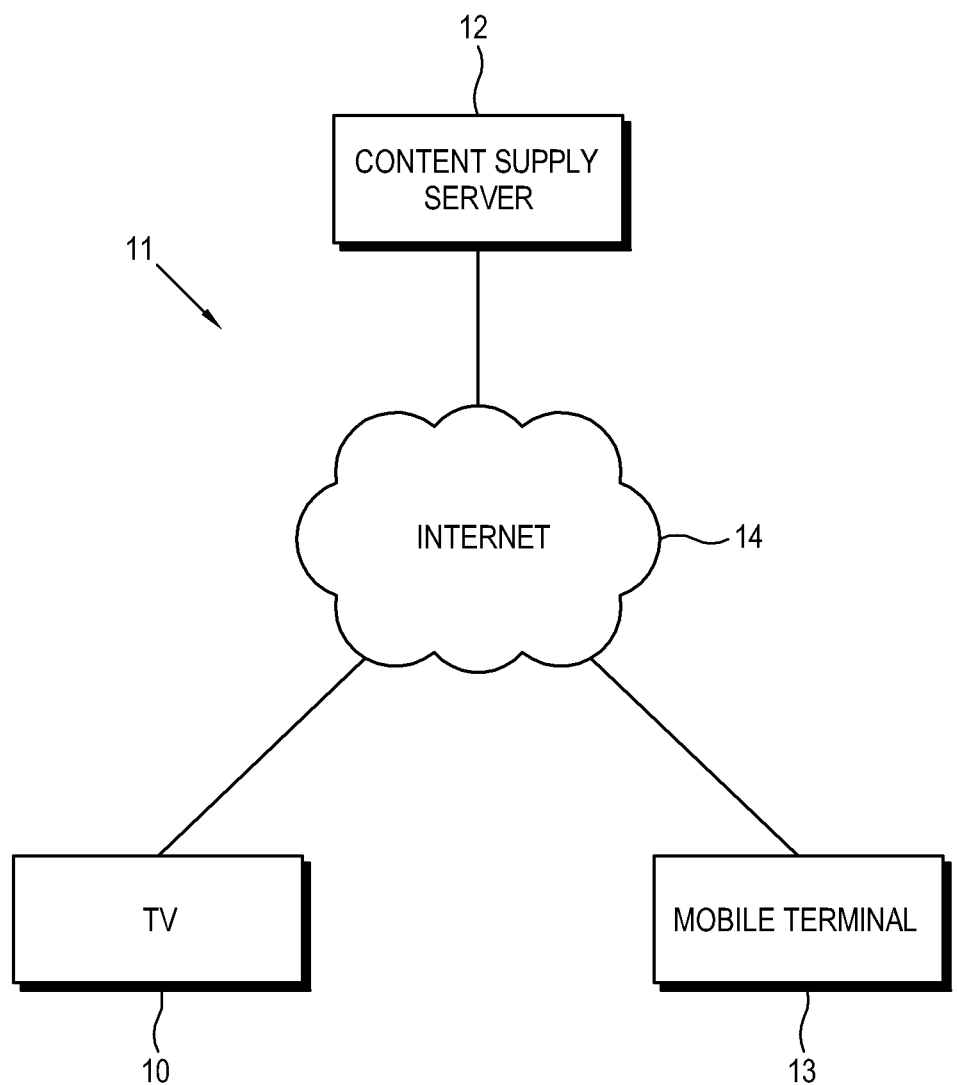
FIG. 1 illustrates a content supply system according to an exemplary embodiment.

FIG. 1 illustrates a content supply system 11 according to an exemplary embodiment. Referring to FIG. 1, a TV 10, a mobile terminal 13 and a content supply server 12 may be connected to the Internet 14. The content supply system 11 according to the exemplary embodiment may include an electronic device such as a personal digital assistant (PDA) (not shown) or a PC (not shown). The display device 10 of the content supply system 11 according to the exemplary embodiment includes the TV 10.

The content supply server 12 may sell various contents, which include comics, game, characters, weather provided through widget, stock, time, news, etc. A user may access the content supply server 12 through the mobile terminal 13 and purchase content therefrom. More specifically, a user may access the content supply server 12, go through a user certification process through an input of ID and password to purchase a content, or purchase the content without an additional user certification process or purchase the content through online payment.

If a user purchases content to be displayed in the mobile terminal 13 (hereinafter, to be called a "first content"), the content supply server 12 may supply a content to be displayed on the TV 10 (hereinafter, to be called a "second content") corresponding to the first content.

The content supply server 12 may store therein user information regarding a plurality of users. That is, the content supply server 12 may store therein users' name, ID, password and serial numbers of the mobile terminal 13 and the TV 10 owned by a user. Accordingly, if a user purchases the first content through the mobile terminal 13, the content supply server 12 stores therein purchase description information of the purchased first content. The purchase description information may include user's ID, password, type of a content and the date of purchase.

The content supply server 12 may be operated plurally. A user may directly access the content supply server 12 or through an integrated server managing the content supply server 12. If the TV 10 or the mobile terminal 13 accesses the content supply server 12, the content supply server 12 may allow a user's access after certification of a user ID and password. Otherwise, the content supply server 12 may allow a user's access after certification of a serial number of the TV or the mobile terminal 13.

If a user requests the second content through the TV 10, the content supply server 12 identifies whether a user has an authority to use the second content. That is, the content supply server 12 compares a user ID and password in the purchase detail of the first content and a user ID and password input through the TV 10. If the IDs and passwords are identical, the content supply server 12 determines that a user has the authority and transmits the second content to the TV 10.

If the TV 10 is connected to the content supply server 12 and a user ID and password are input, the content supply server 12 may supply the second content after identifying the user ID and password. However, if the TV is connected to the content supply server 12 and only the serial number of the TV 10 is identified, the content supply server 12 requests usage authorization information on the second content upon user's request for the second content. If the usage authorization information on the second content is transmitted by the TV 10, the content supply server 12 determines whether a user has the authority to use the second content. The usage authorization information includes a user ID and password.

If a user has purchased the first content, the content supply server 12 may transmit the second content to the TV 10 even in the case when a user does not request for the second content. That is, if the TV 10 is connected to the content supply server 12, the content supply server 12 identifies whether the ID and password input by a user is identical to those in the purchase description information of the first content. If the user IDs and passwords are identical, the content supply server 12 notifies a user of the purchase of the first content and asks a user whether he/she would accept downloading the second content. If a user accepts the downloading, the content supply server 12 supplies the second content. To ask whether to accept downloading the second content, the content supply server 12 may transmit relevant information to the TV 10 so that a user may easily recognize the relevant information. The content supply server 12 may transmit notification information such as sound and characters as well as the relevant information for a user to easily recognize the relevant information.

According to another exemplary embodiment, the content supply server 12 may be divided into a content selling server (not shown) and a content supplying server (not shown). The content selling sever sells contents to the mobile terminal 13 while the content supplying server supplies the content to the TV 10.

If a user purchases the first content from the content selling server through the mobile terminal 13, the content selling server supplies the purchase description of the first content to the content supply server. The purchase description may include user ID, password, date of purchase and the second content. If the TV 10 is connected to the content supplying server, the content supplying server identifies a user's usage authority to the second content through the user ID and password. If a user has the authority to use the second content, the content supply server supplies the second content to the TV 10.

Figure 2:
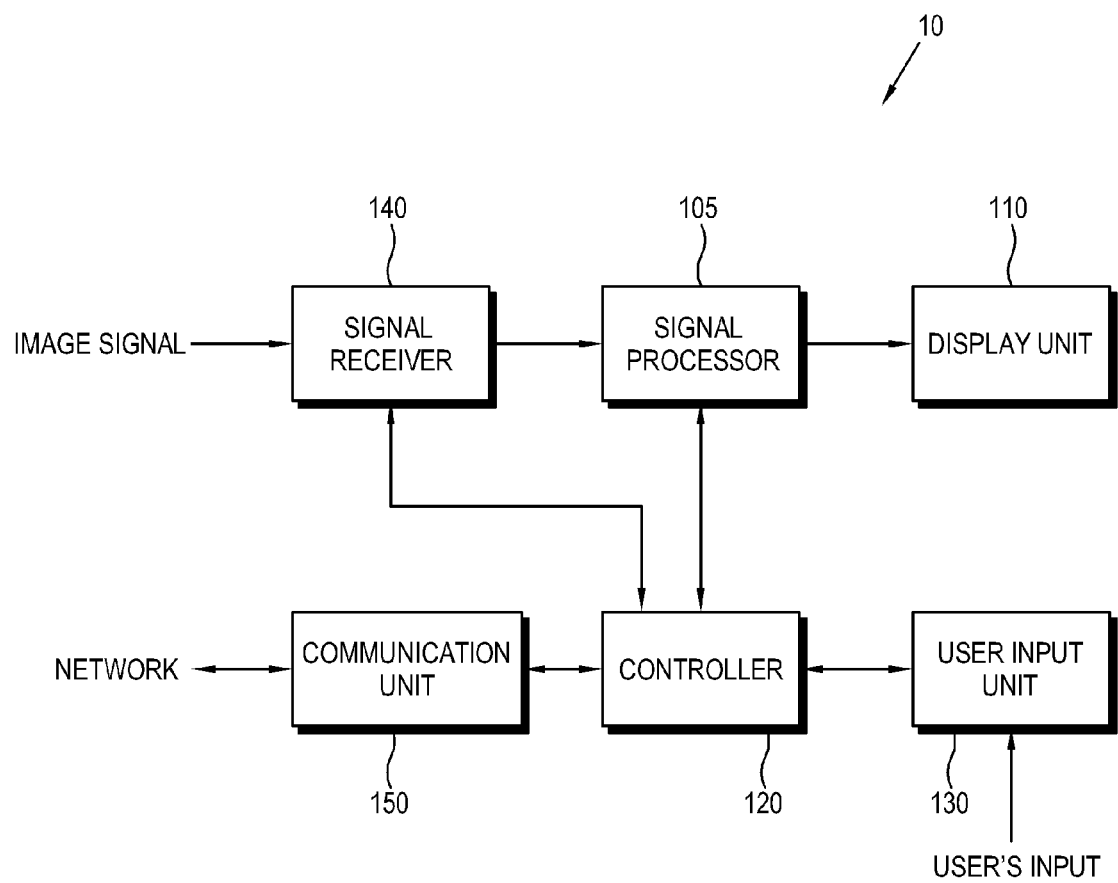
FIG. 2 is a control block diagram of a display device of the content supply system according to the exemplary embodiment.

FIG. 2 is a control block diagram of the display device 10 of the content supply system 11 according to the exemplary embodiment. Referring to FIG. 2, the display device 10 according to the present exemplary embodiment may include a signal receiver 140, a signal processor 105, a display unit 110, a controller 120, a communication unit 150 and a user input unit 130.

The signal receiver 140 receives an image signal from the outside. The image signal which is received by the signal receiver 140 includes a broadcasting signal such as a DTV signal and a cable broadcasting signal. The signal receiver 140 may tune and receive a broadcasting signal of a channel selected by a user according to a control of the controller 120. The image signal which is received by the signal receiver 140 may include a signal which is output by a video device such as a digital versatile disk (DVD), a blue ray disk (BD) or the like device.

The signal processor 105 receives an image signal from the signal receiver 140 and processes the image signal to be displayed on the display unit 110. The processing of the signal by the signal processor 105 includes decoding, image enhancing and scaling of the image signal. The signal processor 105 processes the second content to be displayed on the display unit 110 upon reception of the second content from the content supply server 12.

The display unit 110 displays an image based on an image signal processed by the signal processor 105. The display unit 110 may display the second content processed by the signal processor 105.

The communication unit 150 communicates with the content supply server 12 in a network such as the Internet or communicates in a wired/wireless manner based on TCP/IP. The communication unit 150 may communicate with the content supply server 12 according to a control of the controller 120, transmit information to the content supply server 12 or receive information therefrom. The communication unit 150 according to the present exemplary embodiment may transmit the usage authorization information of the second content input by a user to the content supply server 12 and receive the second content from the content supply server 12. The usage authorization information of the second content may include a user ID and password.

The user input unit 130 is provided to receive a user's input. For example, the user input unit 13 may include a remote controller or a manipulation panel provided in a main body (not shown) of the display device 10. A user's input which is received by the user input unit 130 is transmitted to the controller 120.

The controller controls the signal processor 105 and other elements of the display device 10. If a user inputs the usage authorization information of the second content through the user input unit 130, the controller 120 transmits the usage authorization information to the content supply server 12 through the communication unit 150, and displays the second content received from the content supply server 12.

Figure 3:
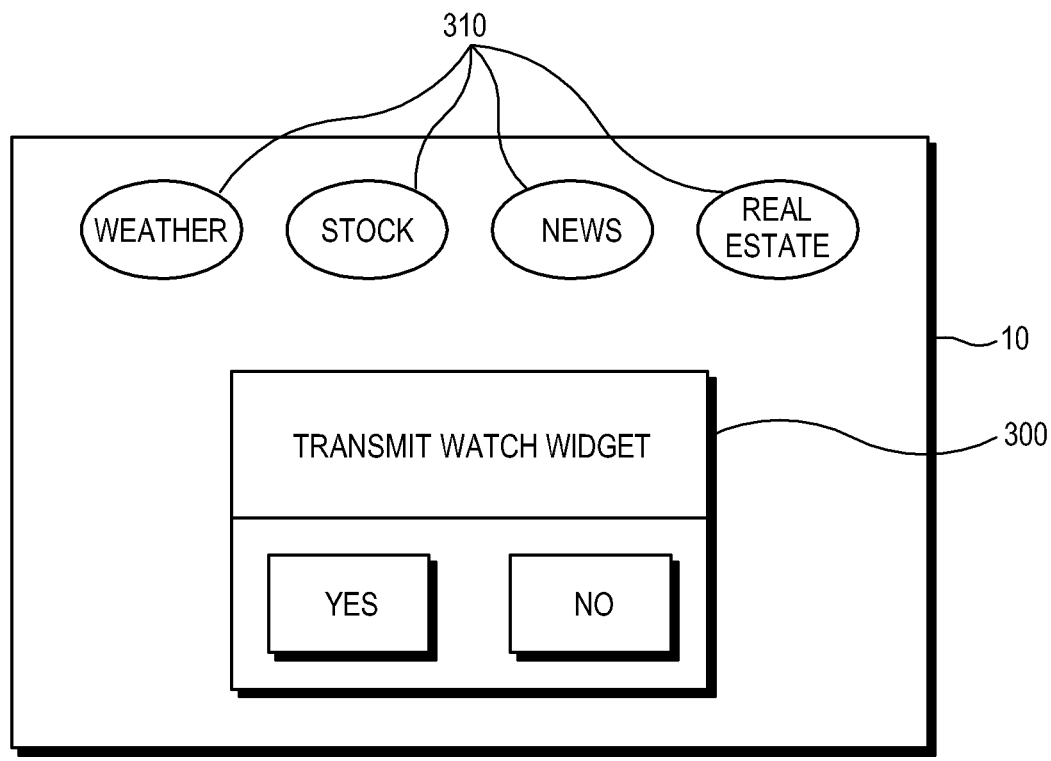
FIG. 3 illustrates content-relating information displayed in the display device of the content supply system according to the exemplary embodiment.

FIG. 3 illustrates content-related information displayed in display device 10 of the content supply system 11 according to the exemplary embodiment.

Referring to FIG. 3, the display device 10 according to the present exemplary embodiment displays basic content 310 such as weather, stock, news and real estate in the Internet mode. If a user selects the news, the controller 120 receives news information from a news server (not shown) and displays the news. If second content-relating information 300 is received from the content supply server 12 through the communication unit 150, the controller 120 displays the second content-relating information 300. As notification information is included in the second content relating information 300, alarm sound or characters may be output or displayed. If a user accepts transmission of the second content after confirming the second content-relating information 300, the content supply server 12 transmits the second content.

Figure 4:
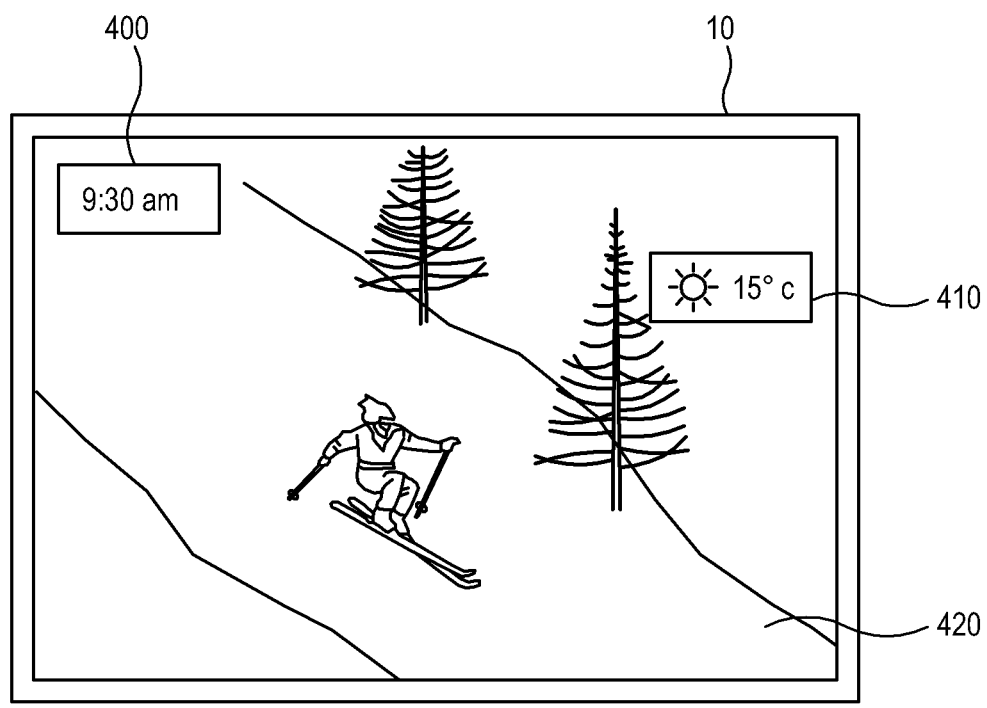
FIG. 4 illustrates a content which is displayed in the display device of the content supply system according to the exemplary embodiment.

FIG. 4 illustrates a content displayed in the display device 10 of the content supply system 11 according to the exemplary embodiment.

If the second content is received from the content supply server 12, the controller 120 displays the received second content.

Referring to FIG. 4, the second content which is supplied to the display device 10 according to the present exemplary embodiment includes, e.g., a clock widget 400 or a weather and temperature widget 410. If a user views a desired broadcasting from the display device 10 according to the present exemplary embodiment, an image 420 is displayed on a screen. If a user executes the second contents 400 and 410, the clock widget 400 and the weather and temperature widget 410 are displayed on the screen together with the image 420. Real-time data for the widget contents 400 and 410 are transmitted to inform a user of time and temperature. Accordingly, a user may confirm the necessary information in real time while viewing broadcasting.

Figure 5:
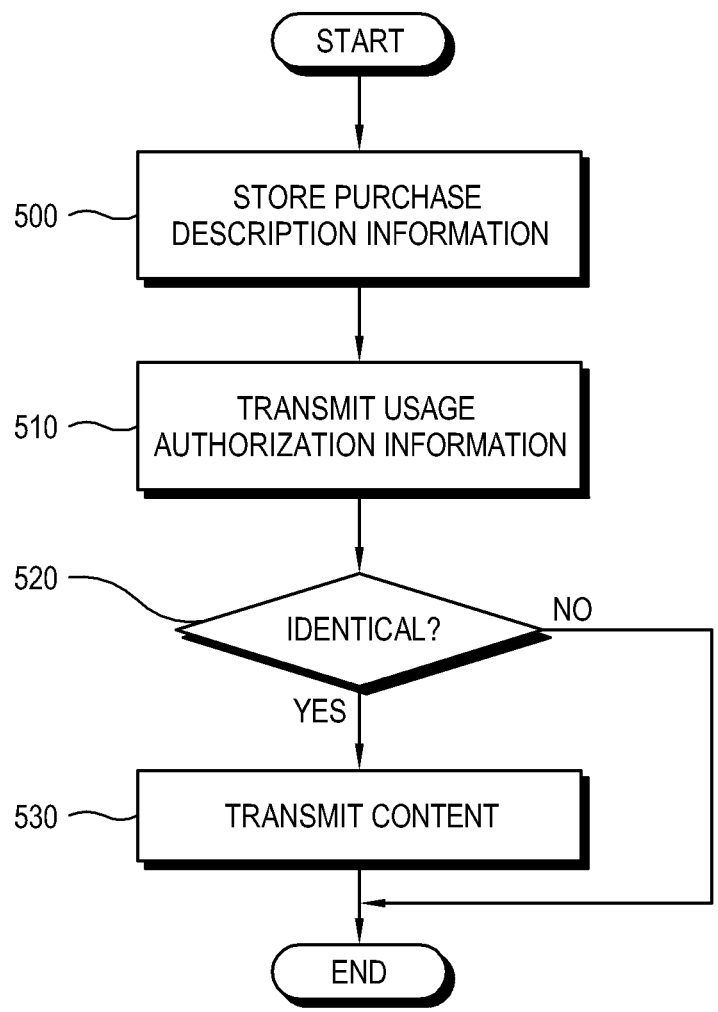
FIG. 5 is a flowchart of a content supply process of the content supply system according to the exemplary embodiment.

FIG. 5 is a flowchart of a content supply process of the content supply system 11 according to the exemplary embodiment. Referring to FIG. 5, if a user purchases the first content from the content supply server 12 through the mobile terminal 13, the content supply server 12 stores therein the purchase description information of the first content (S500). If a user requests the second content through the TV 10, the content supply server 12 requires a user to transmit the usage authorization information of the second content to identify whether he/she has the authority to use the second content (S510).

If a user transmits the usage authorization information of the second content, the content supply server 12 compares the user identification information included in the purchase description information of the first content and the user identification information included in the usage authorization information, and transmits the second content to the TV 10 if the two user identification information are identical (S530).

Figure 6:
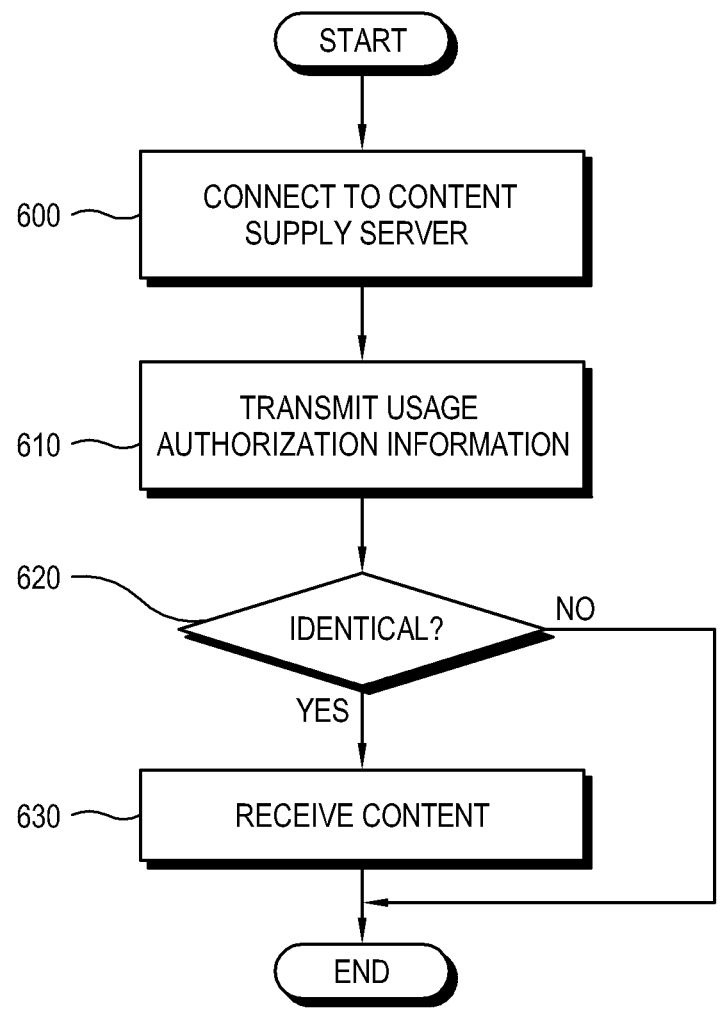
FIG. 6 is a flowchart of a control process of the display device of the content supply system according to the exemplary embodiment.

FIG. 6 is a flowchart of a control process of the display device 10 of the content supply system 11 according to the exemplary embodiment.

Referring to FIG. 6, the display device 10 according to the present exemplary embodiment is connected to the content supply server 12 to receive and display the second content (S600). If the content supply server 12 requests the usage authorization information of the second content, the controller 120 transmits the usage authorization information input by a user to the content supply server 12 (S610). If the user identification information included in the purchase description information of the first content stored in the content supply server 12 is identical to the usage identification information included in the usage authorization information of the second content input by a user (YES at operation S620), the controller 120 receives and displays the content from the content supply server 12.

As described above, according to the exemplary embodiments, a content supply system and a content supply method thereof and a display device and a control method thereof supply content purchased by a user through a user terminal and enables a user to use the content without double payment for the content.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A content supply system, comprising:
a user terminal through which a first content is purchased;
a first content supply server which supplies the first content to the user terminal, and stores therein purchase description information of the first content purchased through the user terminal, the purchase description information comprising first identification information of a user who purchased the first content;
a second content supply server which receives the purchase description information of the purchased first content from the first content supply server, and supplies a second content based on the purchase description information of the purchased first content; and
a display device which transmits, to the second content supply server, second identification information of the user who purchased the first content, and receives the second content supplied from the second content supply server,
the second content supply server identifies whether the first identification information of the purchase description information and the second identification information transmitted from the display device indicate an identical user;
the second content supply server transmitting an information about the second content to the display apparatus; and
the display device displays the transmitted information about the second content received from the second content supply server, and selectively receives the second content based on a user input.

2. The content supply system according to claim 1, wherein the first content supply server supplies the purchase description information of the purchased first content to the second content supply server, and
the second content supply server receives a usage authorization information from the display device, and supplies the second content to the display device in response to the second content supply server determining that the purchase description information of the first content corresponds to the usage authorization information.

3. The content supply system according to claim 1, wherein the second content supply server notifies the display device of the purchase of the first content in response to the second content supply server being connected to the display device to obtain permission to transmit the second content, and supplies the second content to the display device in response to the display device accepting transmission of the second content.

4. The content supply system according to claim 1, wherein the display device requests and receives the second content from the second content supply server.

5. The content supply system according to claim 1, wherein the display device transmits a usage authorization information comprising the second identification information based on a user's input.

6. The content supply system according to claim 1, wherein the second content comprises a display content corresponding to the first content.

7. A content supply system, comprising:
a user terminal through which a first content is purchased;
a first content supply server which supplies the first content to the user terminal, and stores therein purchase description information of the first content purchased through the user terminal, the purchase description information comprising first identification information of a user who purchased the first content;
a second content supply server which receives the purchase description information of the purchased first content from the first content supply server, and supplies a second content based on the purchase description information of the purchased first content; and
a display device which transmits, to the second content supply server, second identification information of the user who purchased the first content, and receives the second content supplied from the second content supply server in response to a determination that the first identification information of the purchase description information of the first content corresponds to the transmitted second identification information,
wherein the second content supply server transmits an information about the second content to the display device, and
wherein the display device displays the transmitted information about the second content received from the second content supply server, and selectively receives the second content based on a user input.

8. A content supply system, comprising:
a first content supply server which supplies a first content to a user terminal, and stores therein purchase description information of the first content purchased through the user terminal, the purchase description information comprising first identification information of a user who purchased the first content;
a second content supply server which receives the purchase description information of the purchased first content from the first content supply server, and supplies a second content based on the purchase description information of the purchased first content; and a display device which transmits, to the second content supply server, second identification information of the user who purchased the first content, and receives the second content supplied from the second content supply server, wherein the second content supply server identifies whether the first identification information of the purchase description information and the second identification information transmitted from the display device indicate an identical user;

the second content supply server transmitting an information about the second content to the display apparatus; and wherein the display device displays the information about the second content received from the second content supply server, and selectively receives the second content based on a user input.

9. A content supply server comprising:
a storage unit arranged to store therein purchase description information of a first content, the purchase description information comprising first identification information of a user who purchased the first content;
a first content supply unit arranged to supply a first content to the first user terminal; and
a second content supply unit arranged to supply a second content to a second user terminal based on usage authorization information of the first content comprising second identification information of the user who purchased the first content transmitted from the second user terminal,
wherein the second content supply unit identifies whether the first identification information of the purchase description information and the second identification information transmitted from the second user terminal indicate an identical user;
the second content supply server transmitting an information about the second content to the display apparatus; and
wherein the second user terminal displays the transmitted information about the second content received from the second content supply unit, and selectively receives the second content based on a user input.

10. The content supply server according to claim 9, further comprising:
a communication unit arranged to receive the usage authorization information from the second user terminal,
wherein the content supply unit is arranged to supply the second content to the second user terminal in response to the content supply unit determining that the purchase description information of the first content corresponds to the usage authorization information.

11. The content supply system according to claim 1, wherein the content supply server notifies the display device of the purchase of the first content without receiving a request regarding the second content from the display device.

12. The content supply system according to claim 7, wherein the content supply server notifies the display device of the purchase of the first content without receiving a request regarding the second content from the display device.

13. The content supply system according to claim 8, wherein the content supply server notifies the display device of the purchase of the first content without receiving a request regarding the second content from the display device.

14. The content supply server according to claim 9, wherein the content supply server notifies the second user terminal of the purchase of the first content without receiving a request regarding the second content from the second user terminal.

15. A content supply method, comprising:
distributing, by a first content supply server, a first content to a user terminal;
purchasing, by the user terminal, the first content;
creating, by the first content server, a purchase description information of the first content purchased by the user terminal;
receiving, by the first content server, a first identification information of a user who purchased the first content;
associating, by the first content server, the received first identification information of the user who purchased the first content to the created purchase description information;
storing, by the first content server, the created purchase description information with the associated first identification information of the user;
transmitting, by the first content server, to a second content supply server, the stored purchase description information of the purchased first content and the first identification information of the user;
receiving, by the second content supply server, the transmitted purchase description information of the purchased first content and the first identification information of the user from the first content server;
creating, by the display device, usage authorization information;
inputting, by the display device, a second identification information of the user who purchased the first content;
transmitting, by the display device, to the second content server, both the created usage information and the inputted second identification information of the user who purchased the first content;
receiving, by the second content server, the transmitted usage information and second identification information of the user who purchased the first content from the display device;
determining, by the second content server, that the received usage information corresponds to the created purchase description information of the first content;
transmitting, by the second content supply server, information about the second content to the display device;
displaying, by the display device, the transmitted information about the second content received from the second content supply server;
inputting, by the display device, a user selection of the displayed information about the second content received from the second content supply server;
displaying, by the display device, the second content.

16. The method according to claim 15, further comprising:
determining, by the second content supply server, that the second content supply server is connected to the display device;
based on a determination that the second content supply server is connected to the display device, notifying the display device of the purchase of the first content through the user terminal;
receiving, by the second content supply server, from the display device, permission to transmit the second content to the display device.

17. The method according to claim 15, wherein the display device requests and receives the second content from the second content supply server.

18. The method according to claim 15, further comprising transmitting, by the display device, to the second content server, usage authorization information input by the user.

19. The method according to claim 15, wherein the second content comprises a display content corresponding to the first content.

* * * * *